June 26, 1956  C. P. CROCO ET AL  2,752,529
RECTIFIER TYPE ARC WELDING APPARATUS
Filed July 28, 1950  5 Sheets-Sheet 2

INVENTORS
Charles P. Croco, Charles H. Jennings,
Ray V. Lester and Emil F. Steinert.
ATTORNEY June 26, 1956 C. P. CROCO ET AL 2,752,529
RECTIFIER TYPE ARC WELDING APPARATUS
Filed July 28, 1950 5 Sheets-Sheet 3

WITNESSES:
Edward Michaels
D. V. Giolma

INVENTORS
Charles P. Croco, Charles H. Jennings,
Ray V. Lester and Emil F. Steinert.
BY
G. M. Crawford
ATTORNEY United States Patent Office 2,752,529
Patented June 26, 1956

2,752,529

RECTIFIER TYPE ARC WELDING APPARATUS

Charles P. Croco and Charles H. Jennings, Buffalo, Ray Verne Lester, Kenmore, and Emil F. Steinert, Williamsville, N. Y., assignors to Westinghouse Electric Corporation, East Pittsburgh, Pa., a corporation of Pennsylvania Application July 28, 1950, Serial No. 176,302

15 Claims. (Cl. 315—141)

Our invention relates, generally, to arc welding apparatus, and has reference in particular to arc welding apparatus of the rectifier type.

Generally stated, it is an object of our invention to provide arc welding apparatus which is simple and inexpensive to manufacture, and is reliable and effective in operation.

More specifically, it is an object of our invention to provide polyphase rectifier type arc welding apparatus which has a quick response to load changes and provides a balanced three-phase load.

Another object of our invention is to provide, in a polyphase rectifier type arc welding apparatus, for utilizing a polyphase source of electrical energy and a polyphase reactor for controlling the value of the welding current.

Yet another object of our invention is to provide, in arc welding apparatus, for utilizing a polyphase transformer having delta-connected secondary windings and a three-phase current limiting reactor having reactance windings connected inside the delta connection.

It is also an object of our invention to provide, in arc welding apparatus, for utilizing a polyphase current limiting reactor having a stationary core section with stub leg portions corresponding to the legs of a movable core member positioned within the stationary reactor windings, so as to minimize the fringing effect of air gap flux.

It is an important object of our invention to provide, in a rectifier type of direct-current arc welding apparatus, for utilizing a rectifier assembly which may be readily removed or replaced and in which the rectifier units are duplicates.

A further object of our invention is to provide, in arc welding apparatus of the dry rectifier type, for utilizing a single blower to effect a flow of air in parallel paths through and about a polyphase rector and its transformer, and then permit a series flow of the combined air streams through the rectifier.

Another important object of our invention is to provide, in arc welding apparatus of the rectifier type, for maintaining an open circuit voltage which is below 75 volts, and yet provide adequate coverage of the entire welding current range.

We further provide, in arc welding apparatus of the rectifier type, for maintaining a predetermined relation of resistance to reactance giving optimum time constant values for various welding current settings.

A further object of our invention is to provide, in arc welding apparatus of the rectifier type, for utilizing a plurality of substantially identical rectifier units which may be readily connected to provide a complete rectifier assembly without requiring a plurality of different types of terminal connections.

Other objects will in part be obvious, and will in part be explained hereinafter.

In accordance with one embodiment of our invention, a three-phase transformer and a three-phase reactor are supported on an open rectangular base by spaced apart, upright supports which are connected at the upper ends to provide a rigid frame-work about which a housing is positioned. The reactor has a stationary core structure with stub leg projections about which are disposed reactor windings which are connected in a closed delta circuit with the secondary windings of the transformer. A rectifier assembly is mounted above the transformer with a baffle on each side and has opposed sections connecting each apex of the delta circuit to a single pair of output terminals of opposite polarity. A blower is mounted in a shrouded opening in the side wall of the housing above the reactor, so as to draw air in through a filter covering the opening in the base, whereupon it passes up around and about the reactor and the transformer before passing through the rectifier.

For a more complete understanding of the nature and the scope of our invention, reference may be made to the following detailed description which may be read in connection with the accompanying drawings, in which.

Figure 1:
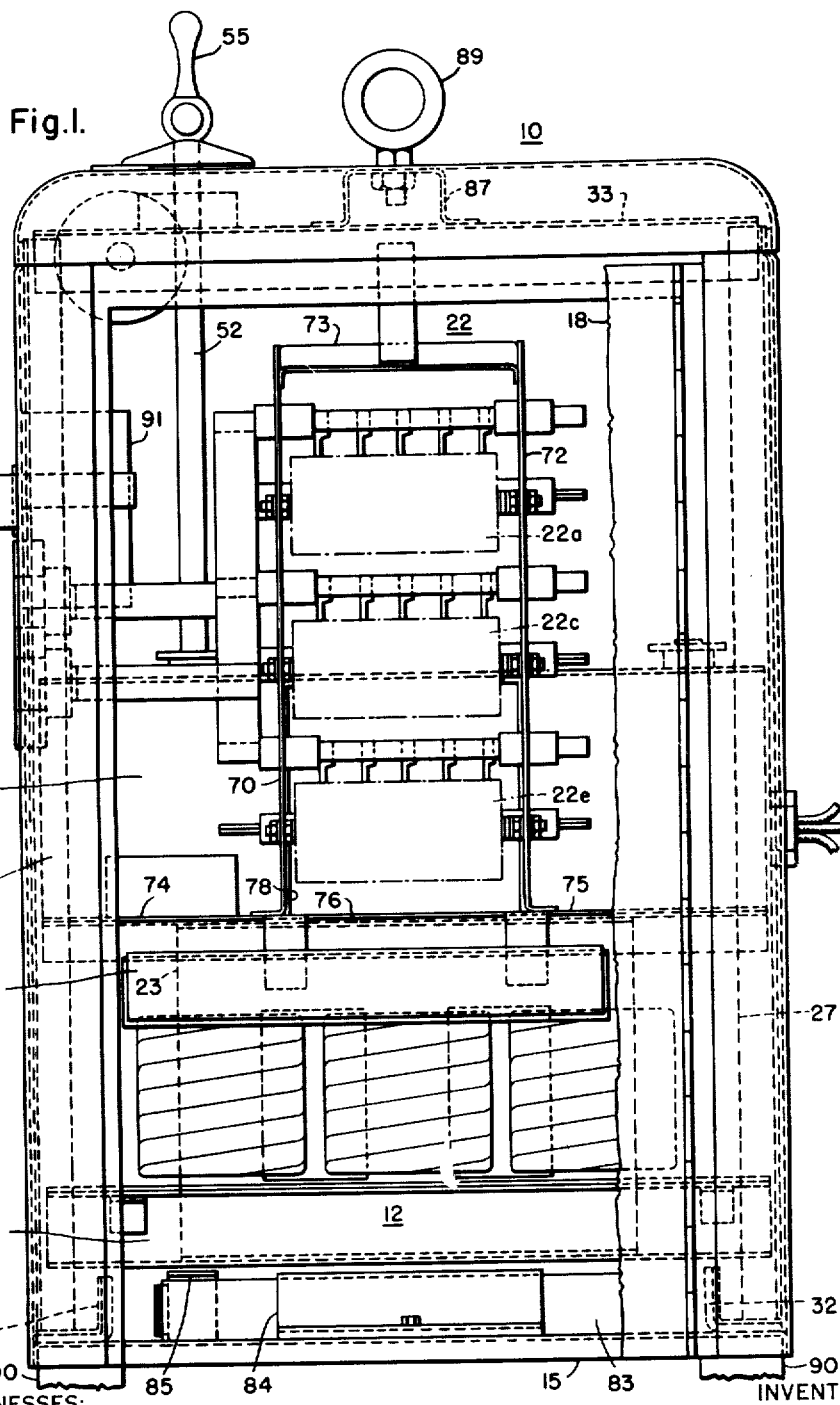
Figure 1 is a front elevational view of an arc welding apparatus of the rectifier type with the door partly broken away to show the interior arrangement.
Figure 2:
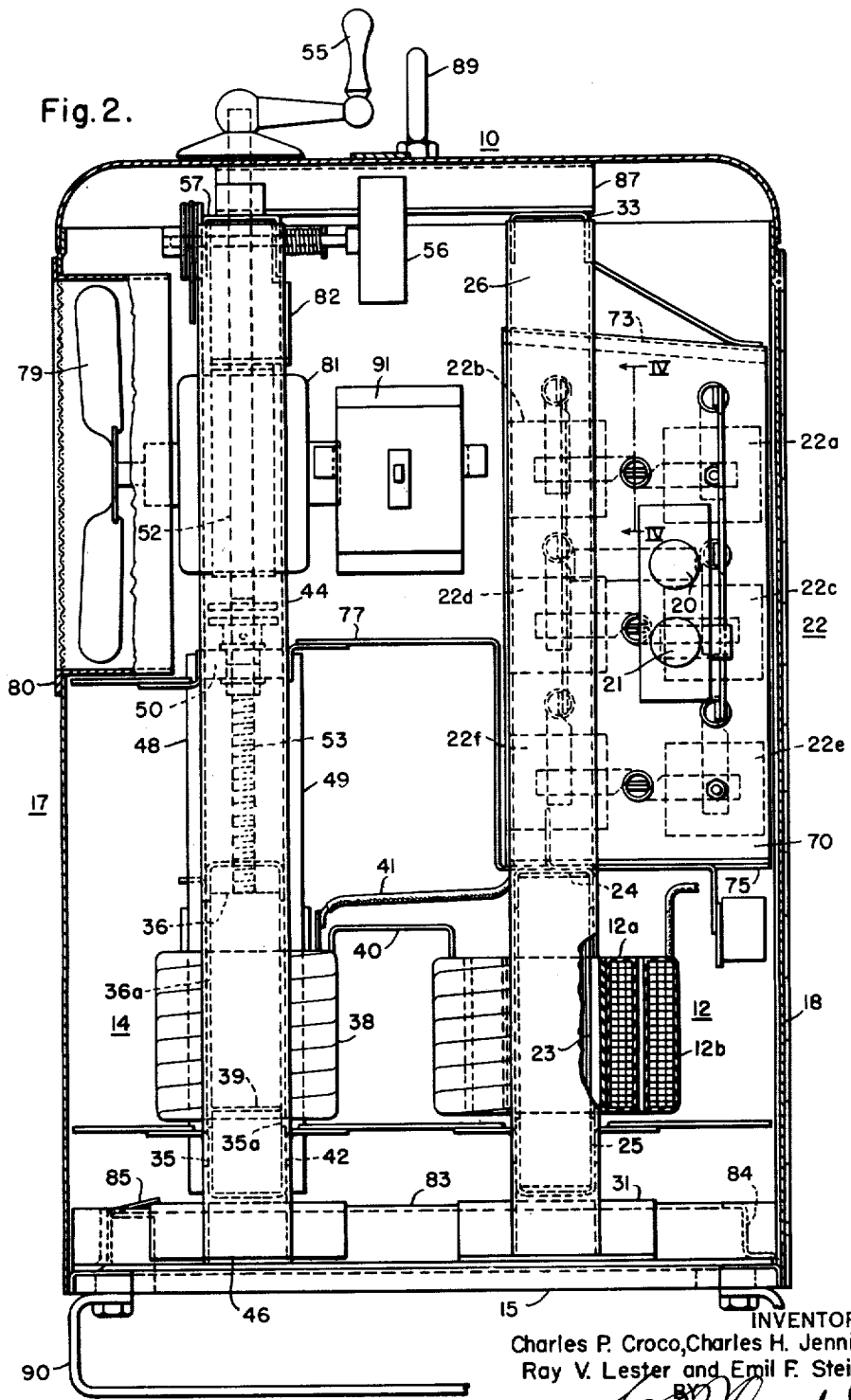
Fig. 2 is a side elevational view of the welding apparatus of Fig. 1 with the side of the housing removed to show the interior arrangement.

Referring to Figs. 1 and 2, the reference numeral 10 may denote, generally, arc welding apparatus of the rectifier type wherein a polyphase transformer 12 and a polyphase reactor 14 may be mounted on a base structure 15, having a housing 17 with a door 18 mounted thereon, for supplying direct current to a welding electrode E and work W through output terminals 20 and 21 through a rectifier assembly 22.

The transformer 12 may comprise a three-legged magnetic core structure 23 having primary and secondary windings 12a and 12b disposed on each of the legs thereof. The transformer 12 may be mounted on the base structure 15 by means of upper and lower channel members 24 and 25 which may be connected to upright support members 26 and 27 disposed on opposite sides of the base structure adjacent the front side thereof. The support members 26 and 27 may be connected at their lower ends to oppositely disposed side angle members 31 and 32 secured to the base structure 15 and at their upper ends by means of a channel connector 33.

Figure 3:
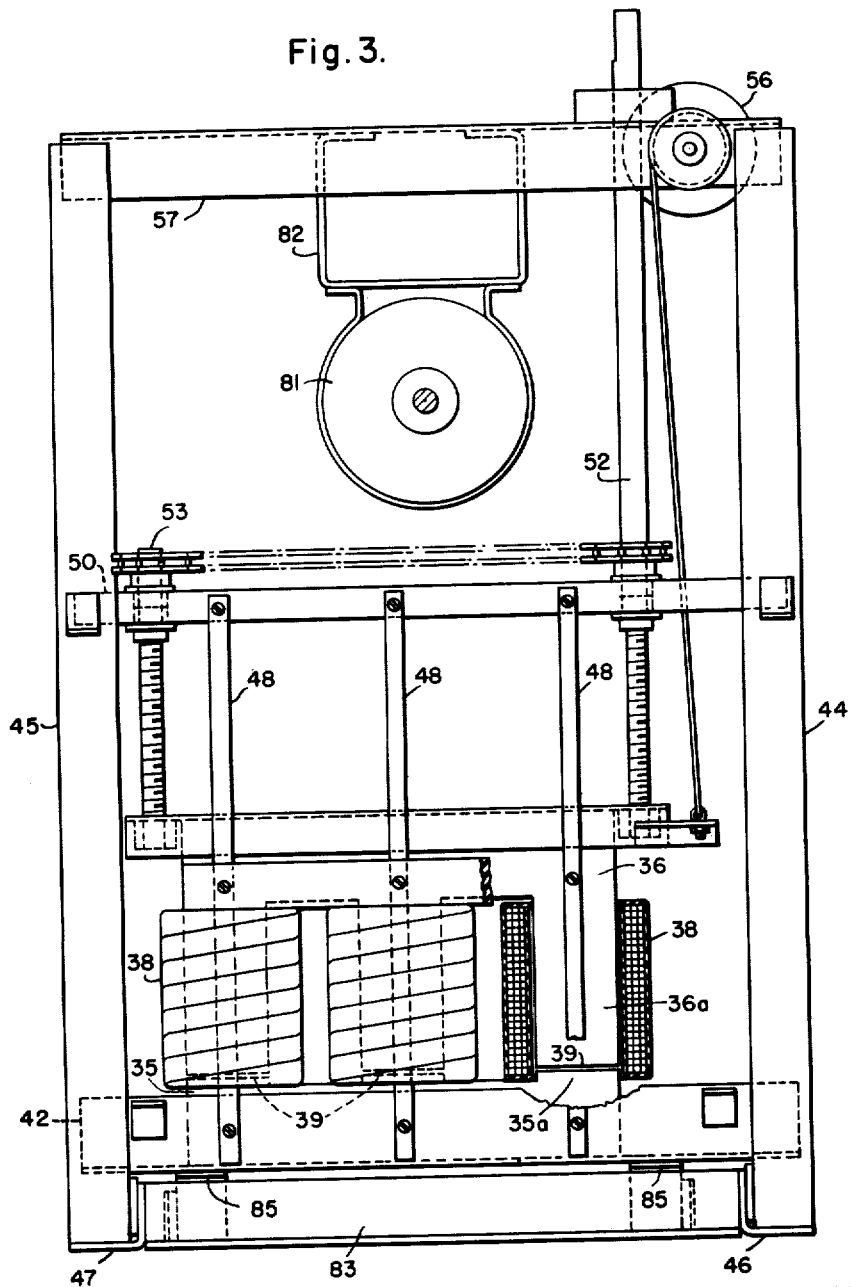
Fig. 3 is a rear elevational view of the reactor structure.

The reactor 14 may comprise, as shown in Figs. 2 and 3, a lower stationary core member 35 having upwardly projecting stub leg portions 35a corresponding to the depending leg portions 36a of a movable polyphase core member 36, which may be positioned above the stationary core member 34. Reactor windings or coils 38 may be positioned on each of the stub leg portions 35a and disposed to receive the movable leg portions 36a so as to provide adjustable air gaps 39 which are entirely within the reactor windings 38. Connectors 40 and 41 may be utilized to connect the windings 38 to the transformer secondary and the rectifier assembly.

The stationary core member 35 may be supported on the base structure 15 by means of a channel support member 42 which may be connected between upright supports 44 and 45 disposed on opposite sides of the base structure and secured by means of angle members 46 and 47. Suitable guides 48 and 49 may be provided for aligning the movable core member 36 and locating the reactor windings 38. The guides 48 and 49 may be suitably connected to the support member 42, and to an intermediate support member 50 extending between the upright supports 44 and 45 intermediate their ends.

The movable core member 36 may be actuated by means of screw members 52 and 53 rotatably supported in the cross member 50, and which may be actuated by means of a suitable crank 55 projecting through the top of the housing 17. An indicating dial 56 may be rotatably mounted on a connector 57 connecting the upright support members 44 and 45 so as to be actuated in response to movement of the core member 36 to indicate the value of current for which the reactor may be adjusted.

Figure 4:
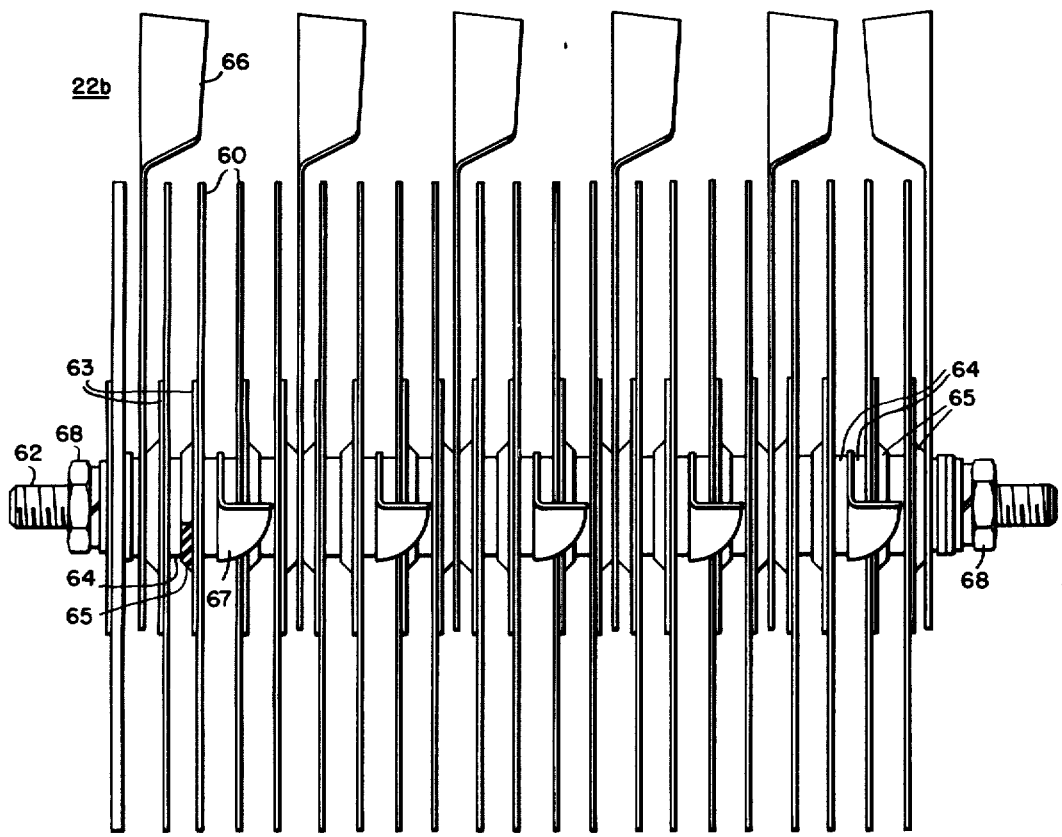
Fig. 4 is an enlarged view taken along the line IV—IV of Fig. 2 showing the structural arrangement of an element of a rectifier unit.

The rectifier assembly 22 may, as shown in Figs. 1 and 2, comprise a plurality of rectifier units 22a through 22f, of which the unit 22b is shown in detail in Fig. 4. Each unit may, for example, comprise a plurality of rectifier plates 60 of the selenium type having a selenium film on a steel plate. The plates may be disposed on a threaded support bar 62 having associated therewith pressure plates 63, spacers 64, and insulating spacers 65. The plates may, for example, be connected, with ten pairs of two plates in series. Positive and negative connectors 66 and 67 may be disposed between the pairs of plates in substantially 90° relation as shown, so as to provide a unit which may be readily connected into any one of the positions, such as shown in Fig. 2.

The plates with their associated pressure discs, spacers and insulating spacers may be assembled on the rods 62 and held between nuts 68 threadedly disposed on the ends of the rods. These rods may be used to mount the units between side sheets 70 and 72, which may be connected adjacent the upper end by a top sheet 73 so as to provide a housing therefor.

The rectifier assembly 22 may be mounted above the transformer on baffle members 74 and 75 supported on the upper channel member 24 of the transformer 12, and which define an opening 76 disposed between the side sheets 70 and 72 of the rectifier device. As seen in Fig. 2, the baffle members 74 and 75 extend from the right-hand side of the casing 17 to the left-hand side of the upright support 26 whence they join an angular or inverted L-sheet 77 extending upwardly until it reaches substantially the central portion of the rectifier device and having an opening 78 therein, whereupon it projects horizontally to the intermediate support 50 of the reactor structure so as to provide for directing all of the air which may be drawn through the reactor and transformer upwardly through the lower portion, and then horizontally through the upper portion of the rectifier assembly.

This may be accomplished by mounting a blower 79 in a shroud 80 in the side wall of the housing 17 for drawing air in through the central opening of the base structure 15. The blower 79 may be driven by means of a motor 81 which may be mounted on the connector 57 of the reactor support structure by means of a substantially U-shaped bracket 82. A filter 83 of the Fiberglas type, for example, may be disposed between the angle members 31 and 32 to cover the opening in the base structure 15 being, for example, mounted thereon by means of clips 84 and 85.

The transformer and reactor support structures may be connected at their upper ends by means of a channel connector 87 which connects the channel connectors 33 and 57 intermediate their ends. Means such as the eye bolt 89 may be attached to the connector 87 for lifting the apparatus as a unit structure. Suitable support means such as, for example, skids 90, may be attached to the base structure 15 for supporting the apparatus. The housing 17 may be secured to the base structure 15 and the upright supports in any suitable manner. A primary circuit breaker 91 for the transformer may be mounted on the housing.

Figure 5:
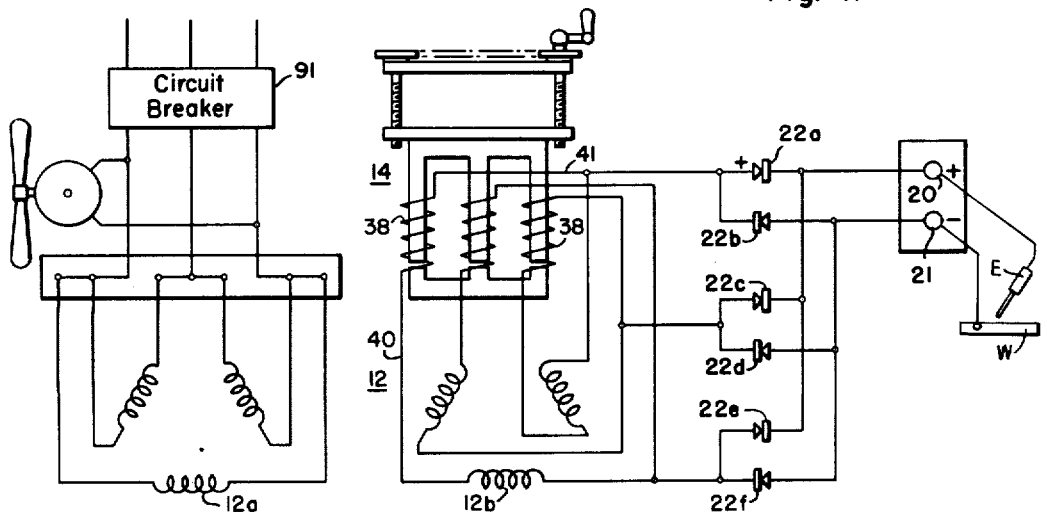
Fig. 5 is a diagrammatic view of the arc welding apparatus shown in Figs. 1 and 2.

Referring to Fig. 5, it will be seen that the primary and secondary windings of the transformer 12 may be connected in closed delta circuit relations, the primary windings being connected to a three-phase source by the primary breaker 91. The windings 38 of the reactor 14 may be connected in series circuit relation with their associated secondary windings within the delta connection, whereby the effects of transients on the rectifier units appear to be modified sufficiently to reduce the possibilities of failure resulting from flashover or breakdown. Each apex of the delta connection may be connected to the output terminals 20 and 21 by means of oppositely disposed rectifier units 22a, 22b, 22c, 22d, 22e, and 22f.

Figure 6:
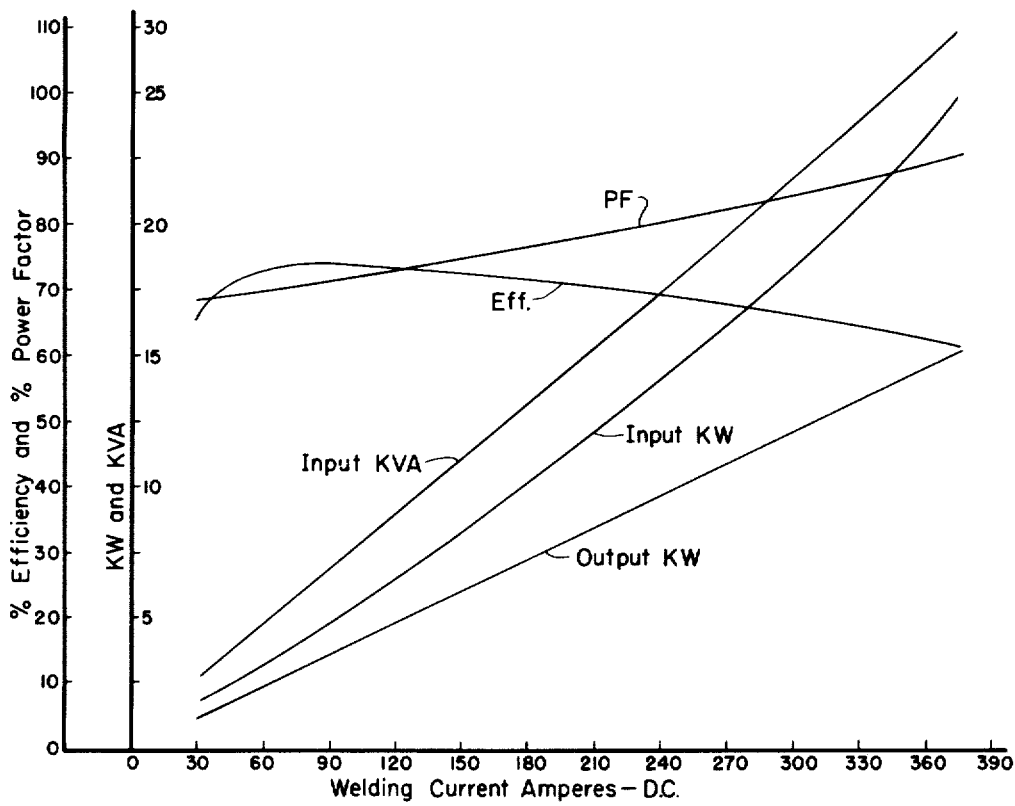
Fig. 6 illustrates performance curves of arc welding apparatus of the type shown in Figs. 1 and 2.

Referring to Fig. 6, it will be seen that the efficiency of the rectifier type welding apparatus ranges from a value of about 65% to a high of approximately 74%, dropping again to a value of about 65% at the rated load which in this case is 300 amperes. The power factor ranges from a value of about 68% to approximately 76% at rated load which is highly favorable when compared with that of the usual transformer type welder.

Figure 7:
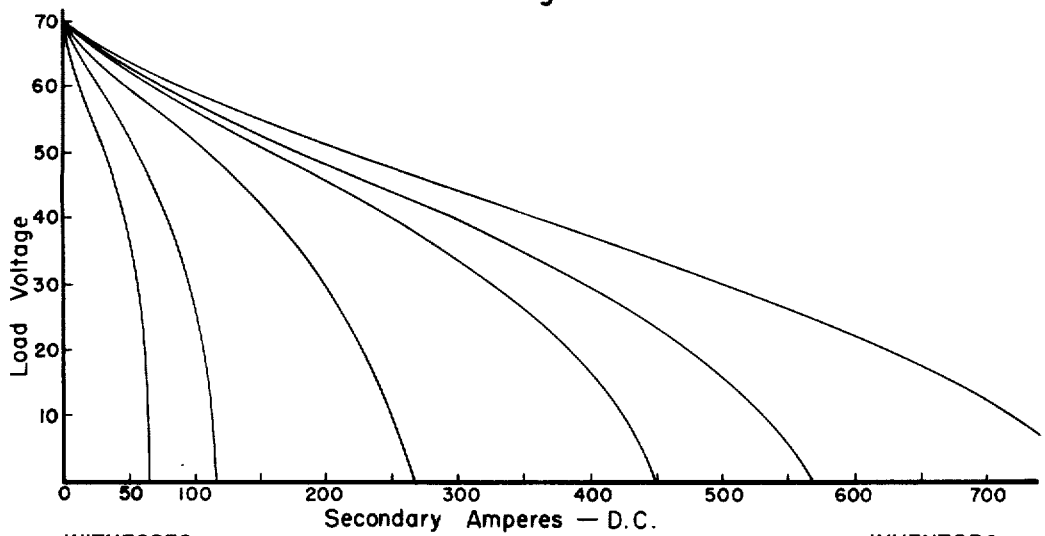
Fig. 7 shows characteristic volt-ampere curves illustrating the load characteristics of arc welding apparatus of the types shown in Figs. 1 and 2.

Referring to Fig. 7, it will be seen that the output characteristics are highly favorable, in that the volt-ampere curve is relatively steep in the welding range, which means that the arc voltage may vary considerably without any appreciable variation in welding current, thus producing a highly stable arc condition.

From the above description and the accompanying drawings, it will be apparent that we have provided a polyphase rectifier type arc welding apparatus which has a relatively high electrical efficiency. An arc welder of the rectifier type using rectifier plates of the selenium type has a relatively fast response to transient load changes, the rectifier welder having a recovery time of approximately .007 second from rated load to short circuit and vice versa, thus lending itself to producing highly stable arc conditions. Arc welding apparatus embodying the features of our invention provides a balanced three-phase load, and the use of a three-phase reactor provides a balanced magnetic construction having a minimum of losses and being exceptionally quiet in operation.

By utilizing an open circuit voltage on the order of 70 volts, the operator is prevented from coming into contact with dangerously high open circuit voltages and yet a stable arc system is readily provided. Because of the relatively high forward resistance of the rectifier elements of the selenium type, it has been found necessary to coordinate the resistance and reactance characteristics of the apparatus and hold these within predetermined limits in order to utilize the relatively simple movable core type reactor for covering the desired wide range of welding current without having to resort to auxiliary means such as tap changing. For example, with arc welding apparatus of a nominal 300 ampere rating, it has been found that two cells per series group with 10 groups in parallel per element (6 elements total) produces a desirable combination. This combination using 5 inch square selenium type cells having a forward resistance drop per cell of 1.5 to 2.0 volts at rated welding current was found to be highly satisfactory. This combination of transformer and reactor used with such an arrangement of rectifier cells has the following characteristics, based on an equivalent single phase circuit and referred to the secondary at 70 volts open circuit:

| | | | | |
|---|---|---|---|---|
| Output, amperes | 30 | 90 | 300 | 362 |
| Resistance R (ohms) | .178 | .088 | .0654 | .064 |
| Reactance X (ohms) | 2.53 | .79 | .228 | .186 |
| Ratio X/R | 14.2 | 8.0 | 3.49 | 2.9 |
| Time Constant L/R | .0376 | .016 | .0044 | .003 |

Any considerable deviation from the above results in:

1. Shortening of welding current range, thus necessitating auxiliary means of extending it.
2. A highly special and expensive design of adjustable reactor and rectifier.
3. Reduction in the slope of the volt-ampere characteristic curves.
4. A higher open circuit secondary voltage with corresponding increase in size and cost of apparatus to compensate for these changes.

Since certain changes may be made in the above-described construction, and different embodiments of the invention may be made without departing from the spirit or scope thereof, it is intended that all the matter contained in the above description and shown in the accompanying drawings shall be considered as illustrative and not in a limiting sense.

We claim as our invention:

1. Arc welding apparatus comprising, a three-phase transformer having secondary windings connected in a closed delta circuit, a current regulating reactor having a three-legged stationary core with reactance windings associated with each leg connected in circuit relation with each secondary winding within the delta and an associated movable three-legged core having one leg disposed within each reactance winding, a pair of terminals adapted to be connected to material to be welded, and oppositely disposed rectifier devices connecting each apex of the delta to said output terminals.

2. The combination with a three-phase arc welding transformer having primary and secondary windings, of a three-phase current limiting reactor comprising a common core with three stub legs each having a reactance winding disposed thereabouts and a movable core with leg portions disposed within said windings in association with said stub legs, said reactance windings being connected one in series with each of the secondary windings in a closed delta circuit, a pair of output terminals, and rectifier means of the selenium type connecting each apex of the delta to said output terminals in opposite senses.

3. Arc welding apparatus comprising, a polyphase transformer having primary and secondary windings, reactance means including a polyphase reactor having reactor windings connected in a closed delta circuit with the seondary windings, and rectifier means connecting each apex of the delta in opposite senses to output terminals of the opposite polarity, the 60 cycle reactance of the transformer and reactor bearing a ratio on the order of 3.5 to one times the forward resistance of the rectifier means at the nominal current rating of the apparatus.

4. Arc welding apparatus comprising, a base structure, a polyphase transformer having primary and secondary windings, an upright support structure disposed to support the transformer adjacent one side of the base structure, a polyphase reactor having reactance windings connected in circuit relation with the transformer secondary windings, an additional upright structure disposed to support the reactor on the base structure in side-by-side relation with the transformer, rectifier means mounted on the first mentioned upright support structure above the transformer and connected in circuit relation with the secondary windings and reactor windings, and support means connecting the upright structures adjacent their upper ends to provide a unified structure for mounting lifting means for the apparatus.

5. Arc welding apparatus comprising, a substantially open base structure, an air filter disposed to cover an opening in said base structure, a transformer having primary and secondary windings, upright support means disposed to support the transformer above said base structure with the axis of said winding substantially perpendicular to said base structure and adjacent one edge thereof, a reactance device having a core member with a reactance winding connected in circuit relation with said secondary windings, additional upright support means disposed to support said reactance device in side-by-side relation with the transformer with the axis of the reactance winding substantially perpendicular to said base structure, rectifier means comprising a plurality of dry type plate elements disposed on transverse rods and connected in circuit relation with said secondary windings, a baffle extending over the transformer and reactor secured to said upright support means to provide a support for the rectifier means, said baffle having an opening beneath the rectifier means, a housing disposed on the base structure about said upright supports, and a blower disposed in an opening in an upper sidwall portion of said housing.

6. In arc welding apparatus, a base structure having a substantially open center portion, an air filter covering said open center portion, a polyphase transformer having primary and secondary windings with air ducts therebetween, an upright support structure mounted on said base structure arranged to position the transformer in spaced relation thereto, a polyphase reactor having a plurality of reactor windings connected in circuit relation with the transformer secondary windings, an additional upright support structure mounted on said base structure arranged to position the reactor in spaced relation above the base structure and in side-by-side relation with the transformer, a housing mounted on the base structure about the upright support structures, a baffle supported on said upright support structures above the transformer and reactor, said baffle having an opening substantially above the transformer, rectifier means supported on the baffle above the opening, and a blower device mounted adjacent an opening in the housing on the reactor side thereof to draw air upwardly through the rectifier means, transformer and reactor from the opening in the base structure.

7. The combination in arc welding apparatus, of a three-phase transformer having secondary windings connected in a closed delta circuit, a three-phase reactor having a reactance winding connected in series circuit relation with each secondary winding within the delta, a welding electrode and material to be welded by an electric arc between the electrode and the material, first rectifier means connecting each apex of the delta to said electrode and poled to conduct current of one polarity to said electrode, and second rectifier means connecting each apex of the delta to the material and poled to conduct current of the opposite polarity to said material, the open circuit voltage impressed by said secondary windings through said rectifiers between said electrode and said material being derived substantially only from said secondary windings, so that in the event of an arc outage the maximum voltage for restarting the arc is available.

8. Arc welding apparatus comprising, a welding electrode and material to be welded by an electric arc between the electrode and the material, a polyphase transformer having primary and secondary windings, means connecting said primary windings in a closed delta network, a polyphase reactor having alternating current windings, means connecting said alternating current windings and in a closed delta network with said secondary windings, first rectifier means of the selenium type connecting each apex of said delta network to said electrode and poled to conduct current of said arc of one polarity thereto, and second rectifier means of the selenium type connecting each apex of said delta network to the said material and poled to conduct current of said arc of the opposite polarity thereto, the open circuit voltage impressed by said secondary windings through said rectifiers between said electrode and said material being derived substantially only from said secondary windings, so that in the event of an arc outage the maximum voltage for restarting the arc is available.

9. Apparatus according to claim 7 characterized by the fact that each of the six rectifiers constituting the first and second rectifier means consists of 10 groups of selenium type cells, each cell being of the order of 5 inches square and each group consisting of two cells in series and by the further fact that the output of the transformer is such that the potential between the terminals is of the order of 70 volts.

10. Arc welding apparatus comprising a welding electrode and materials to be welded by an electric arc between the electrode and the materials, a three-phase transformer having three secondary windings, means for connecting said windings in a delta network, first rectifier means connecting each apex of said network to said electrode and poled to conduct current of said arc of one polarity thereto, and second rectifier means for connecting each apex of said network to said material and poled to conduct current of said arc of the opposite polarity thereto, the open circuit voltage impressed by said secondary windings through said rectifiers between said electrode and said material being derived substantially only from said secondary windings, so that in the event of an arc outage the maximum voltage for restarting the arc is available.

11. An arc welder of the rectifier type adapted to be supplied from a polyphase source through a polyphase transformer having primary and secondary windings and including a welding electrode and material to be welded by an electric arc between the electrode and the material characterized by the fact that the primary and the secondary windings of said transformer are each connected in a polygonal network and by first rectifier means connected between each apex of said network and said electrode and poled to conduct current of said arc of one polarity and second rectifier means connected between each apex of said network and said material and poled to conduct current of said arc of the opposite polarity, and further characterized by the fact that the open circuit voltage impressed by said secondary windings through said rectifiers between said electrode and said material being derived substantially only from said secondary windings, so that in the event of an arc outage the maximum voltage for restarting the arc is available.

12. Arc welding apparatus comprising a polyphase transformer having a plurality of secondary windings corresponding in number to the phase number of said transformer; a welding electrode and material to be welded by an electric arc between said electrode and material; variable reactance means corresponding in number to the phase number of said transformer; a plurality of rectifier components of the selenium type corresponding in number to the phase number of said transformer; means for connecting said secondary windings and said reactance means in a polygonal network, each leg of which includes a secondary winding and an associated reactance means; means for connecting each of the legs of said network and each of said rectifier components in a circuit including said electrode and material so that a direct-current arc is produced between said electrode and material, the forward resistance of each said rectifier components and the resistance of the corresponding reactance means and secondary winding being coordinated with the reactance characteristic of said reactance means, and said resistances being held within predetermined limits to afford at the proper setting for a given arc current the optimum conditions for arc welding, the open circuit voltage impressed by said secondary windings through said rectifiers between said electrode and said material being derived substantially only from said secondary windings, so that in the event of an arc outage the maximum voltage for restarting the arc is available.

13. Arc-welding apparatus, comprising in combination a three-phase arc-welding transformer having secondary windings connected in a closed delta circuit, a three-phase reactance means having reactance in series circuit relation with each secondary winding within the delta, a first terminal adapted to be connected to a welding electrode, a second terminal adapted to be connected to material to be welded by an electric arc between the electrode and the material, first rectifier means connecting each apex of the delta to said first terminal and poled to conduct welding current of one polarity to said electrode, and second rectifier means connecting each apex of the delta to the second terminal and poled to conduct welding current of the opposite polarity to said material, the open circuit voltage impressed by said secondary windings through said rectifiers between said electrode and said material being derived substantially only from said secondary windings, so that in the event of an arc outage the maximum voltage for restarting the arc is available.

14. An arc welder of the rectifier type adapted to be supplied from a polyphase source through a polyphase arc welding transformer having primary and secondary windings and including a welding electrode terminal and a work terminal respectively adapted to be connected to a welding electrode and material to be welded by a welding electric arc between the electrode and the material characterized by the fact that the primary and secondary windings of said transformer are each connected in a polygonal network, by means cooperative with said secondary windings for varying the reactances of the legs of the network in which said secondary windings are connected and by first rectifier means connected between each apex of said network and said electrode terminal and poled to conduct current of said welding arc of one polarity and second rectifier means connected between each apex of said network and said work terminal and poled to conduct current of said welding arc of the opposite polarity, the open circuit voltage impressed by said secondary windings through said rectifiers between said electrode and said material being derived substantially only from said secondary windings, so that in the event of an arc outage the maximum voltage for restarting the arc is available.

15. An arc welder of the rectifier type adapted to be supplied from a polyphase source through a polyphase arc-welding transformer having secondary windings and including a welding electrode and material to be welded by a welding electric arc between the electrode and the material characterized by the fact that the secondary windings of said transformer are connected in a polygonal network, by means cooperative with said secondary windings for varying the reactances of the legs of said network and by first rectifier means connected between each apex of said network and said electrode and poled to conduct current of said welding arc of one polarity and second rectifier means connected between each apex of said network and said material and poled to conduct current of said welding arc of the opposite polarity, the open circuit voltage impressed by said secondary windings through said rectifiers between said electrode and said material being derived substantially only from said secondary windings, so that in the event of an arc outage the maximum voltage for restarting the arc is available.

References Cited in the file of this patent

UNITED STATES PATENTS

| Number | Name | Date |
| --- | --- | --- |
| 751,016 | Rogers | Jan. 19, 1904 |
| 891,797 | Crocker | June 23, 1908 |
| 1,157,823 | Thomas | Oct. 26, 1915 |
| 1,420,885 | Stoekle | June 27, 1922 |
| 1,434,346 | Jonas | Oct. 31, 1922 |
| 1,610,920 | Bethenod | Dec. 14, 1926 |
| 1,650,072 | Jones et al. | Nov. 22, 1927 |
| 1,673,698 | Muller | June 12, 1928 |
| 1,839,148 | Greene | Dec. 29, 1931 |
| 1,928,848 | Crout | Oct. 3, 1933 |
| 1,959,513 | Weyandt | May 22, 1934 |
| 2,175,841 | Kafka | Oct. 10, 1939 |

(Other references on following page)

UNITED STATES PATENTS

| Number | Name | Date |
|---|---|---|
| 2,221,576 | Dawson | Nov. 12, 1940 |
| 2,265,930 | Scout | Dec. 9, 1941 |
| 2,403,637 | Christie | July 9, 1946 |
| 2,403,891 | Lamm | July 9, 1946 |
| 2,422,958 | Emery | June 24, 1947 |
| 2,433,563 | Johnson | Dec. 30, 1947 |
| 2,462,913 | Sorenson | May 1, 1949 |
| 2,477,211 | Smith | July 26, 1949 |
| 2,501,331 | Hein | Mar. 21, 1950 |
| 2,533,225 | Cronvall et al. | Dec. 12, 1950 |
| 2,579,235 | Kerns | Dec. 18, 1951 |
| 2,588,155 | Ofverholm et al. | Mar. 4, 1952 |
| 2,628,340 | Potter | Feb. 10, 1953 |
| 2,644,109 | Mulder | June 30, 1953 |
| 2,655,586 | Schreiner et al. | Oct. 13, 1953 |
| 2,679,024 | Oestreicher | May 18, 1954 |

FOREIGN PATENTS

| Number | Country | Date |
|---|---|---|
| 369,632 | France | Nov. 20, 1906 |
| 249,427 | Switzerland | Apr. 1, 1948 |

Disclaimer 2,752,529.—*Charles P. Croco* and *Charles H. Jennings*, Buffalo, *Ray Verne Lester*, Kenmore, and *Emil F. Steinert*, Williamsville, N.Y. RECTIFIER TYPE ARC WELDING APPARATUS. Patent dated June 26, 1956. Disclaimer filed Nov. 6, 1959, by the assignee, *Westinghouse Electric Corporation*.

Hereby enters this disclaimer to claims 10 and 11 of said patent.
[*Official Gazette December 8, 1959.*]